United States Patent [19]

Tsuyama

[11] Patent Number: 4,586,113
[45] Date of Patent: Apr. 29, 1986

[54] LAMP FOR BICYCLE

[75] Inventor: Sadaharu Tsuyama, Osaka, Japan

[73] Assignee: Tsuyama Mfg. Co., Ltd., Japan

[21] Appl. No.: 687,654

[22] Filed: Dec. 31, 1984

[30] Foreign Application Priority Data

Jan. 24, 1984 [JP] Japan ............................... 59-9066[U]

[51] Int. Cl.⁴ ............................................. F21L 9/00
[52] U.S. Cl. ..................................... 362/72; 362/188;
362/201; 339/95 A; 313/281
[58] Field of Search ................. 362/72, 195, 196, 197,
362/198, 201, 285, 188, 368; 339/95 A; 313/281

[56] References Cited

U.S. PATENT DOCUMENTS

| 642,906 | 2/1900 | Hedgeland | 362/72 |
| 3,626,357 | 12/1971 | Kindell et al. | 339/95 A |
| 3,719,919 | 3/1973 | Tibolla | 339/95 A |
| 3,878,387 | 4/1975 | Kovacic | 362/72 |
| 4,510,557 | 4/1985 | Tsuyama | 362/72 |

FOREIGN PATENT DOCUMENTS 1549251 11/1968 France .................................. 362/72

Primary Examiner—Magdalen Y. C. Moy
Attorney, Agent, or Firm—Allegretti, Newitt, Witcoff & McAndrews, Ltd.

[57] ABSTRACT

An illuminating device for a wheeled vehicle, such as a bicycle, comprising a light housing and a battery case pivotally secured to one another by means including a pair of branched arm portions so that vertical angle of the position of said light housing can be adjusted. Metallic terminals for positive and negative current are provided in a battery case to press and hold batteries therein and the respective ends thereof extend from the battery case along the inner sides of the arm portions. Metallic terminals for positive and negative current in the light housing extend to a base portion of the light housing in through holes in the base portion. An electrical connection is made between the respective terminals in the light housing and the battery case by means of a pair of washers, each having a projection thereon fixed between the inner sides of the arm portions and the outer sides of the base portion. Bolt means extend through aligned openings in the arm portions, base portion and washers for pressing the parts together to retain the light housing and battery case in adjusted position and for making a firm electrical connection between the respective terminals in the battery case and the light housing and the washers.

5 Claims, 3 Drawing Figures

LAMP FOR BICYCLE

BACKGROUND OF THE INVENTION

This invention relates to an illuminating device for use with a wheeled vehicle, such as a bicycle, comprising a battery case and a light housing, and particularly to an improvement in the wiring structure of such illuminating device.

Known illuminating devices comprise a battery case, a light housing and an electrical connection between the battery case and the light housing that is generally provided by lead wires. The electrical connection or wiring structure employing lead wires of known devices has various problems. First, since the light housing is mounted rotatably around a support axis with respect to the battery case in order to allow the angular position of the light housing to be adjusted, there is a possibility of a relatively large force being applied to the lead wires when the light housing is rotated, and if the lead wires are too short, the lead wires may be broken or damaged, or there is a possibility of the wire being cut when caught by any object.

Lead wires made long enough to have slack to accommodate full rotation of the light housing may not be desirable from an aesthetic viewpoint. In addition, there is another problem, namely, in manufacturing, the connection of the lead wires and terminals must be soldered or screw-driven, which takes much time and sometimes does not provide a secure electrical connection.

The present invention has been made in order to overcome the above-mentioned problems, and an object of the present invention is to provide an illuminating device for use with a bicycle which has a battery case and light housing and electrically connecting the battery case and the light housing with each other without using any lead wires, the electrical connection being secure, being pleasing aesthetically, and being easy to manufacture.

According to the invention, the electric terminals in the battery case are electrically connected with the electric terminals in the light housing utilizing the washers used in the connection to pivotally support the light housing on the battery case. More specifically, the illuminating device according to the invention comprises a battery case and a light housing, with a base portion of the light housing being pivotally supported by a pair of arm portions of the battery case so that the angular position of the light housing can be adjusted with respect to the battery case. The invention is characterized in that electric terminals are provided in the battery case so that the terminals hold cells therebetween, respective ends of positive and negative terminals of the electric terminals extending on the opposing sides of the arm portions, and positive and negative terminals in the light housing extend in the through-holes to the base portion of the light housing. A hole is provided through the arm portions to pivotally hold the base portion. Two washers are provided between the base portion and the arm portions. Each washer is interposed between an outer side of the base portion and an adjacent inner side of the arm portion. The washers have projections to be inserted into the through-holes to engage with the terminals from the light housing.

BRIEF DESCRIPTION OF THE DRAWINGS

The present invention will now be described, by way of example, with reference to the accompanying drawings, in which.

DESCRIPTION OF THE EMBODIMENT

Figure 1:
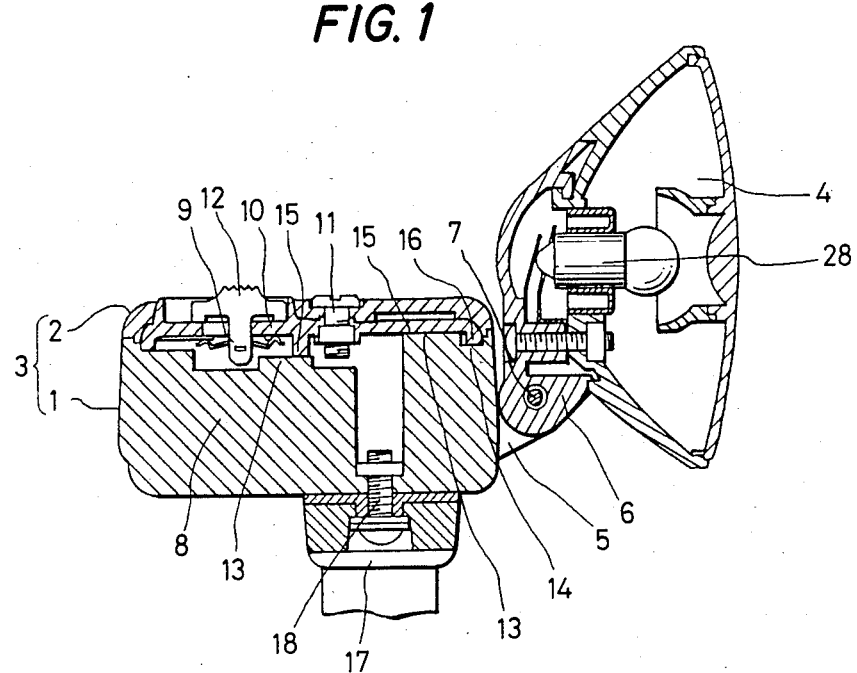
FIG. 1 is a longitudinal sectional view of an embodiment of the illuminating device of the invention.
Figure 2:
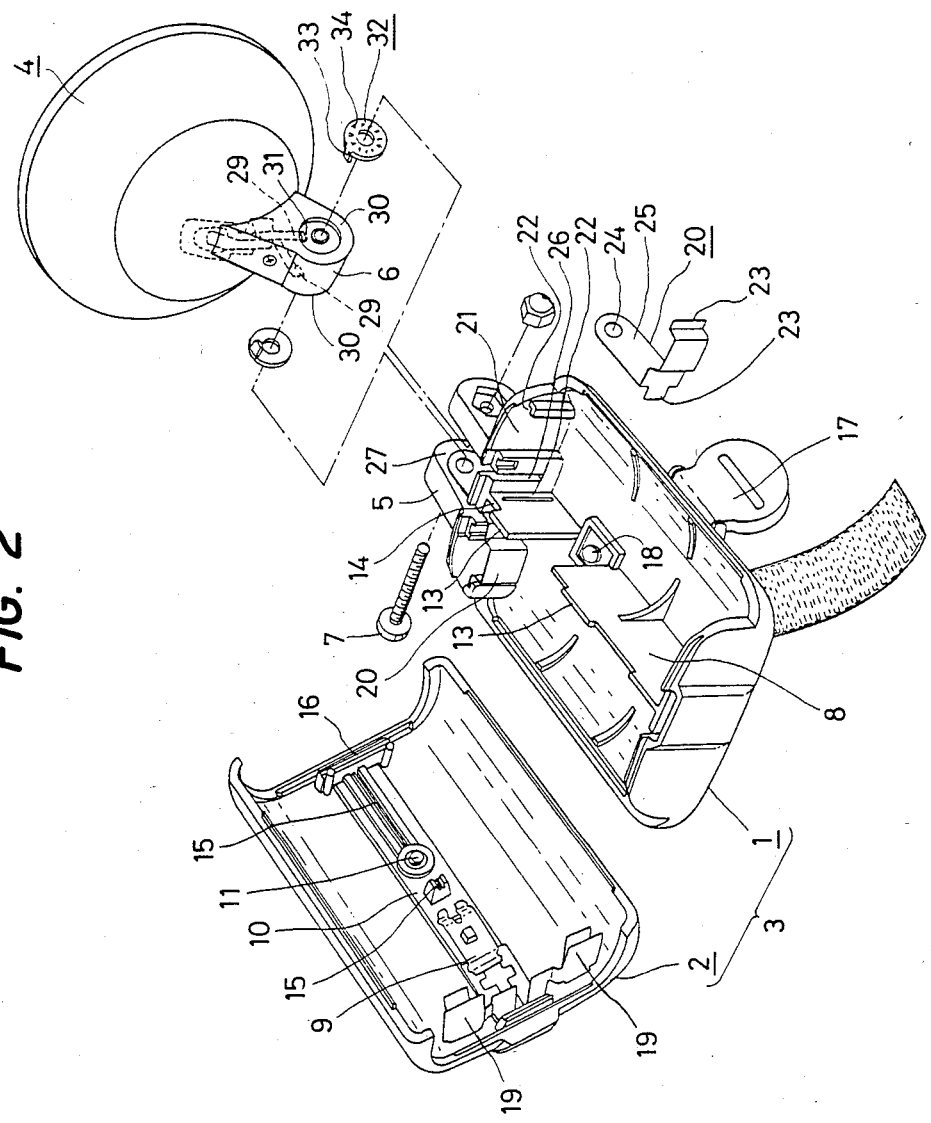
FIG. 2 is an exploded perspective view of the embodiment shown in FIG. 1.

Referring now to the drawings, in particular to FIGS. 1 and 2 which show the overall structure of an embodiment of the illuminating device, 1 is a battery vessel or body, and 2 is a lid therefor. These members 1 and 2 form together a battery case 3 to accommodate two cells or batteries therein. 4 is a light housing having a base portion 6 pivotally held by the threaded bolt 7 between a pair of spaced arm portions 5 of the battery vessel 1 so that the vertical angle of the position of the light housing 4 can be adjusted. The threaded bolt 7 passes through aligned openings in the arm portions 5 and the base portion 6.

In the central portion of the battery vessel 1 there is provided a partition wall 8, which is located so as to separate a pair of cells (not shown) to be juxtaposed in the battery vessel 1. A plate 10, which carries a switch mechanism 9, is secured by fastening means, such as screw 11, to the inside of the lid 2 opposite to the said partition wall 8. An actuation member 12 of the switch mechanism 9 extends through an opening in the lid and projects upwardly from the lid. The top of the actuation member 12 is accessible to the user. Two top edge portions 13 of the front portion of the partition wall 8, and the front edge 14 of the battery vessel 1, are welded by ultrasonic welding with two confronting receiving edges 15 and a downwardly-extending front inner edge 16, both on the plate 10. The plate 10 is thereby permanently secured to the partition 8 of the battery vessel 1 and the battery vessel 1 and the lid 2 are detachably secured together by screw 11. To substitute new cells for old ones, screw 11 is unscrewed and the lid 2 is detached from the plate 10.

Figure 3:
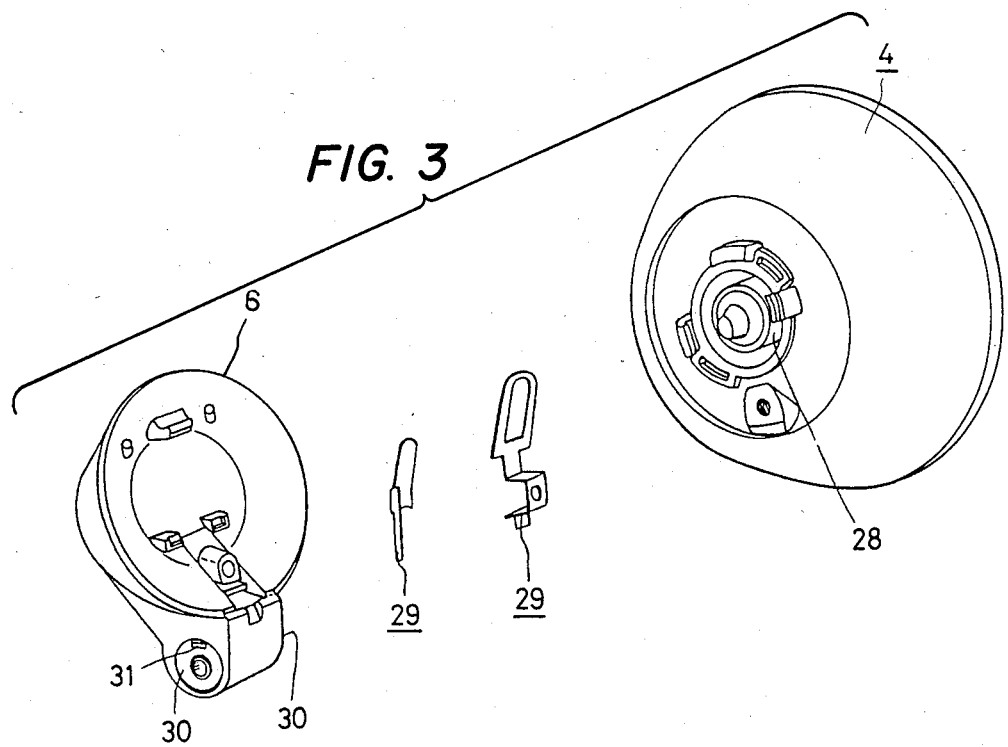
FIG. 3 is an enlarged exploded perspective view of the principal parts of the embodiment shown in FIGS. 1 and 2.

An interruption in the partition wall 8 of the battery vessel 1 provides a space for the mounting screw 18 which is used to secure the mounting member 17 for mounting the overall illuminating device to a bicycle (not shown) under the battery vessel 1. The mounting member 17 cooperates with a mounting strap in known fashion. 19 and 20 are electric terminals to hold cells therebetween. The rear electric terminals 19 are positioned so as to be electrically connected to or disconnected from a metallic member of the switch mechanism 9 by the switching action of the mechanism 9, and these terminals 19 have both edges accommodated in slide grooves (not shown). The terminals 20 likewise have both edges 23 press-fitted in slide grooves 22 which are provided facing a front wall 21 of the battery vessel 1. The terminals 20 each have a projecting end 25 which is formed with a through-hole 24. When the terminals 20 are mounted in position, the projecting ends 25 extend through gaps 26 in the front wall 21 of the battery vessel 1, projecting outwardly and forwardly to lie facing the opposite sides 27 of the said arm portions 5. As shown in FIG. 3, inside the base portion 6 of the light housing 4, there extends positive and negative electric terminals 29 which connect in turn to light source 28. On each side 30 of the base portion 6, there is provided an opening 31 through which the terminals 29 can be seen.

Between the arm portions 5 of the battery vessel 1, the light housing 4 is pivotally held with washers 32 interposed between the sides 27 and 30. Each washer 32 is fabricated from electrically conductive material and has a projection 33 whose end thereof extends through opening 31 and connects with a terminal 29 inside the light housing 4. When the threaded bolt 7 is tightened, the washers 32 are pressed against respective terminals 20. By pressing engagement of the washers and connection of the ends of the projections 33 with the terminals 29, electric connection between the light housing 4 and the battery case 3 is effected. The washers 32 have roughened surfaces, for example, a number of grooves 34, which prevent the unscrewing of the threaded bolt 7, thus maintaining the light housing 4 tight in adjusted position.

As understood from the foregoing, the illuminating device according to the invention needs no lead wires. This means that the illuminating device does not suffer from various problems due to the presence of lead wires. The use of the metal washers, in particular, simplifies the construction, and thus is advantageous in terms of economy of cost and ease of manufacturing.

While I have shown a presently preferred embodiment of the present invention, it will be understood the invention may be embodied in other forms within the scope of the appended claims.

What is claimed is:

1. An illuminating device for a bicycle or like wheeled vehicle comprising a light housing and a battery case pivotally secured to one another by means including a pair of branched arms so that the vertical angle of the position of said light housing can be adjusted, metallic terminals for positive and negative current provided in the battery case to press and hold batteries therein and the respective ends thereof of the metallic terminals extending from the battery case along the inner sides of the arm portions, metallic terminals for positive and negative current in the light housing extending to a base portion of the light housing in through holes in the base portion, an electrical connection being made between the respective terminals in the light housing and the batteries case by means of a pair of washers each having a projection thereon fixed between the arm portions and the base portion.

2. An illuminating device as in claim 1 wherein the projections on the washers engage the metallic terminals in the light housing.

3. An illuminating device as in claim 2 wherein means are provided on the surfaces of the washers to help fix the battery case and the light housing in adjusted portion with respect to one another.

4. An illuminating device as in claim 3 including bolt means extending through aligned openings in the arm portions, the base portion of the light housing, and the washers for securing the light housing and the battery case to one another.

5. An illuminating device as in claim 4 wherein the washers are disposed between the inner sides of the arm portions and the outer sides of the base portion.

* * * * *